United States Patent [19]

Pober et al.

[11] Patent Number: 4,983,157
[45] Date of Patent: Jan. 8, 1991

[54] CENTRIFUGATION SYSTEM USING STATIC LAYER

[75] Inventors: Richard L. Pober, Waban; Bruce E. Novich, Lexington, both of Mass.

[73] Assignee: Ceramics Process Systems Corp., Milford, Mass.

[21] Appl. No.: 338,492

[22] Filed: Apr. 13, 1989

Related U.S. Application Data

[63] Continuation of Ser. No. 28,757, Mar. 23, 1987, abandoned.

[51] Int. Cl.[5] .......................... B01D 43/00; B04B 1/00
[52] U.S. Cl. .......................... 494/37; 494/43; 494/85
[58] Field of Search ................ 494/37, 27, 43, 67, 494/65, 68, 69, 70, 71, 72, 73, 74, 75, 85; 209/172, 155, 198, 199; 210/787, 789, 512.1, 512.3, 369; 422/209, 258, 269, 261, 270

[56] References Cited

U.S. PATENT DOCUMENTS

| | | | |
|---|---|---|---|
| 1,062,216 | 5/1913 | Berrigan . | |
| 1,154,575 | 9/1915 | McCallum . | |
| 1,423,169 | 7/1922 | Thayer | 209/199 |
| 1,749,057 | 3/1930 | Armentrout | 494/27 |
| 1,933,119 | 10/1933 | Peltzer et al. | 494/85 X |
| 1,951,108 | 3/1934 | Reilly | 209/199 |
| 2,239,492 | 4/1941 | Marquis | 494/85 X |
| 2,869,779 | 1/1959 | Geissler | 494/37 |
| 3,328,282 | 6/1967 | Keith, Jr. et al. | 494/37 X |
| 3,519,400 | 7/1970 | Anderson | 210/789 X |
| 3,536,253 | 10/1970 | Anderson et al. | 494/27 |
| 3,819,110 | 6/1974 | Baturov et al. . | |
| 4,414,106 | 11/1983 | Romanauskas | 209/155 |
| 4,533,468 | 8/1985 | Ensor et al. | 209/172 |

Primary Examiner—Harvey C. Hornsby
Assistant Examiner—Scott J. Haugland
Attorney, Agent, or Firm—Bradley N. Ruben

[57] ABSTRACT

An improved method and system are provided for centrifugally separating a suspended colloidal phase. The method in accordance with a preferred embodiment of the invention involves filling a spinning centrifuge bowl with a fluid medium distinct from the suspension, so that a static zone of liquid forms in the bowl, and then introducing the suspension into the bowl in a feed location concentrically inside of the static zone.

11 Claims, 8 Drawing Sheets

PARTICLE SIZE DISTRIBUTION OF AS RECEIVED ALCOA A-16 SUPERGROUND ALUMINA

FIG. 6

```
              NICOMP DISTRIBUTION ANALYSIS
SIZE NANOMETERS                              RELATIVE MASS
  CB00.01
  5400.0  |
  3599.9  |
  2700.0  |
  2160.0  |
  1799.9  |
  1542.8  |
  1350.0  |
  1200.0  |***                                       6.1
  1080.0  |*********************                    41.8
   981.8  |****************************************  76.5
   900.0  |************************************************  100.0
   830.7  |********************************         65.0
   771.4  |**************                           30.1
   719.9  |
   675.0  |
   635.2  |
   600.0  |
   598.4  |
   540.0  |
   514.2  |
   490.9  |
   489.5  |
   450.0  |
   432.0  |
   415.3  |
   400.0  |
   385.7  |
   372.4  |
   359.9  |
   348.3  |
   337.5  |
   327.2  |
   317.5  |
   308.5  |
   300.0  |
   291.8  |
   284.2  |
   275.9  |
   270.0  |
   263.4  |
   257.1  |
   251.1  |
   245.4  |*                                         2.5
   240.0  |****                                     10.4
   234.7  |*******                                  16.0
   229.7  |********                                 17.8
   225.0  |*****                                    10.1
   220.4  |**                                        4.3
   216.0  |
   211.7  |
   207.6  |
   203.7  |
   200.0  |
   196.3  |
   192.8  |
   189.4  |

0.8-1.2 μm BD POWDER/ 10-23-86/BN
   MEAN DIAM. = 811.5    STD.DEV. = 269.2  (33 %)
   RESIDUAL = 0.0    FIT ERROR = 0.8    CH.#1 = 751 K   FIT # = 2
   FROM THE GAUSSIAN ANALYSIS, CHI SQR. = 13.2
CHANNELL WIDTH   = 4.0E1 USEC
PRESCALE FACTOR  = 4.0
TEMPERATURE      = 20.00 DEGREES CENT.
VISCOSITY        = 1.002 CENTIPOISE
INDEX OF REFRAC  = 1.330
SINE OF ANGLE/2  = .7070
LASER WAVELENGTH = 632.8 NANOMETERS
DELAYED BASELINE? Y
```

```
                  NICOMP DISTRIBUTION ANALYSIS
   SIZE NANOMETERS                              RELATIVE MASS
   3599.9 |
   1799.9 |
   1200.0 |
    900.0 |
    719.9 |
    600.0 |*                                         2.3
    514.2 |*****************                        35.2
    450.0 |***********************************      70.1
    400.0 |*************************************** 100.0
    359.9 |**********************************       67.4
    327.2 |**************                            29.4
    300.0 |
    276.9 |
    257.1 |
    240.0 |
    235.0 |
    211.7 |
    200.0 |
    189.4 |
    179.5 |
    171.4 |
    163.6 |
    156.5 |
    150.0 |
    143.9 |
    138.4 |
    133.3 |
    128.5 |
    124.1 |
    120.0 |
    116.1 |
    112.5 |
    109.0 |**********                               22.4
    105.8 |****                                      7.8
    102.8 |*********                                20.3
    100.0 |**                                        3.7
     97.2 |*********                                17.6
     94.7 |**                                        4.5
     92.3 |
     90.0 |
     87.8 |
     85.7 |
     83.7 |
     81.8 |
     80.0 |
     78.2 |
     76.5 |
     75.0 |
     73.4 |
     71.5 |
     70.5 |
     69.2 |
     67.9 |
     66.8 |
     65.4 |
     64.2 |
     63.1 |
   CPS-2/BN/12-8-86
     MEAN DIAM. = 349.1    STD.DEV. = 133.0  (38 %)
     RESIDUAL = 0.0      FIT ERROR = 9.5    CH.#1 = 10 K   FIT # = 2
     FROM THE GAUSSIAN ANALYSIS, CHI SQR. = 2.3
   CHANNELL WIDTH   = 4.0E1 USEC
   PRESCALE FACTOR  = 4.0
   TEMPERATURE      = 20.00 DEGREES CENT.
   VISCOSITY        = 1.002 CENTIPOISE
   INDEX OF REFRAC  = 1.330
   SINE OF ANGLE/2  = .7070
   LASER WAVELENGTH = 632.8 NANOMETERS
   DELAYED BASELINE? Y
```

CENTRIFUGATION SYSTEM USING STATIC LAYER

This specification is a continuation of application Ser. No. 028,757, filed Mar. 23, 1987, now abandoned.

FIELD OF THE INVENTION

This invention relates to centrifugal size classification of particulate matter, and in particular, to a method and system for obtaining narrow size distribution separation of a suspended colloidal phase, and for permitting selective chemical reactions involving colloids in the separation process.

BACKGROUND ART

The use of centrifugation for size classification (separating particulate matter into size fractions) is known in the art.

Separating powders into narrow particle-size ranges is accomplished through dispersion sedimentation. Sedimentation rate is given by Stokes' law of settling:

$$v = h/t = \frac{Kr^2 g (\rho_p - \rho_m)}{\zeta}$$

where $v$ = a particle's settling velocity, $h$ = the distance through which the particle settles, $t$ = the time required for the particle to settle through distance h, $r$ = the particle radius, $g$ = acceleration due to gravity, $\rho_p$ = particle density, $\rho_m$ = density of the medium, $\zeta$ = liquid viscosity, and $K$ = the particle-shape factor (2/9 for a sphere), which takes into account both a particle's volume and its cross-sectional area.

The sum of a medium's buoyant force and the drag on a submicrometer particle makes simple gravitational settling time-consuming and tedious, and therefore uneconomical. Increasing the settling forces through centrifugal sedimentation speeds settling. Because a particle's terminal velocity is proportional to the square of its size, large particles settle through a medium considerably faster than do smaller particles, allowing easy separation. For centrifugal separation, the Svedberg-Nichols modification of Stokes' law is applicable:

$$t_{sec} = \frac{(1/K)\zeta \ln (x_2/x_1)}{\omega^2 r^2 (\rho_p - \rho_m)}$$

where $t$ = the time required for a particle to settle through a distance $x_2 - x_1$, for $x_2$ = the rotating radius of the centrifuge to the end point of the particle's travel path and $x_1$ = the rotating radius of the centrifuge to the beginning point of the particle's travel path; $\omega$ = angular velocity of the centrifuge in radians/sec.; and r, $\rho_p$, $\rho_m$, $\zeta$, and K are as defined above.

Under traditional approaches, a specific particle-size classification ("cut") is achieved by first calculating the angular velocity and residence time required to force particles larger than the largest desired size out of the dispersion to form a sediment on the wall. The dispersion is placed in a centrifuge bowl and then centrifuged under these calculated conditions, and the resulting overflow, containing only particles finer than the upper limit of the desired increment, is decanted. The overflow is then processed in a fashion similar to that used for the original dispersion, so that all particles larger than the lowest size desired are spun out of suspension onto the centrifuge wall. This second sediment consists of particles within the desired size range and is therefore retained.

DISCLOSURE OF INVENTION

We have found that a principal problem with such "batch" centrifugation of the prior art is that at the beginning of each centrifugation procedure, particle distribution in the dispersion is random, so as particles within the desired size range are forced out of suspension, smaller particles also settle with them, into the sediment.

The present invention provides an improved method and system for centrifugally separating a suspended colloidal phase and for permitting selective chemical reactions involving colloids in the separation process. Accordingly, although the discussion below is principally with respect to particulates, it will be understood that the invention is applicable generally to separation of a suspended colloidal phase, which term is intended, in this description and in the following claims, to include particulates, liquid droplets, and vapor bubbles that are in suspension form. The method in accordance with a preferred embodiment of the invention involves filling a spinning centrifuge bowl with a fluid medium distinct from the suspension, so that a static zone of liquid forms in the bowl, and then introducing the suspension into the bowl.

BRIEF DESCRIPTION OF THE DRAWINGS

The invention will be more readily understood in connection with the following drawings, in which:

FIG. 6 is a graph showing the particle size distribution after a second classification process in accordance with the present invention.

DESCRIPTION OF SPECIFIC EMBODIMENTS

Figure 1:
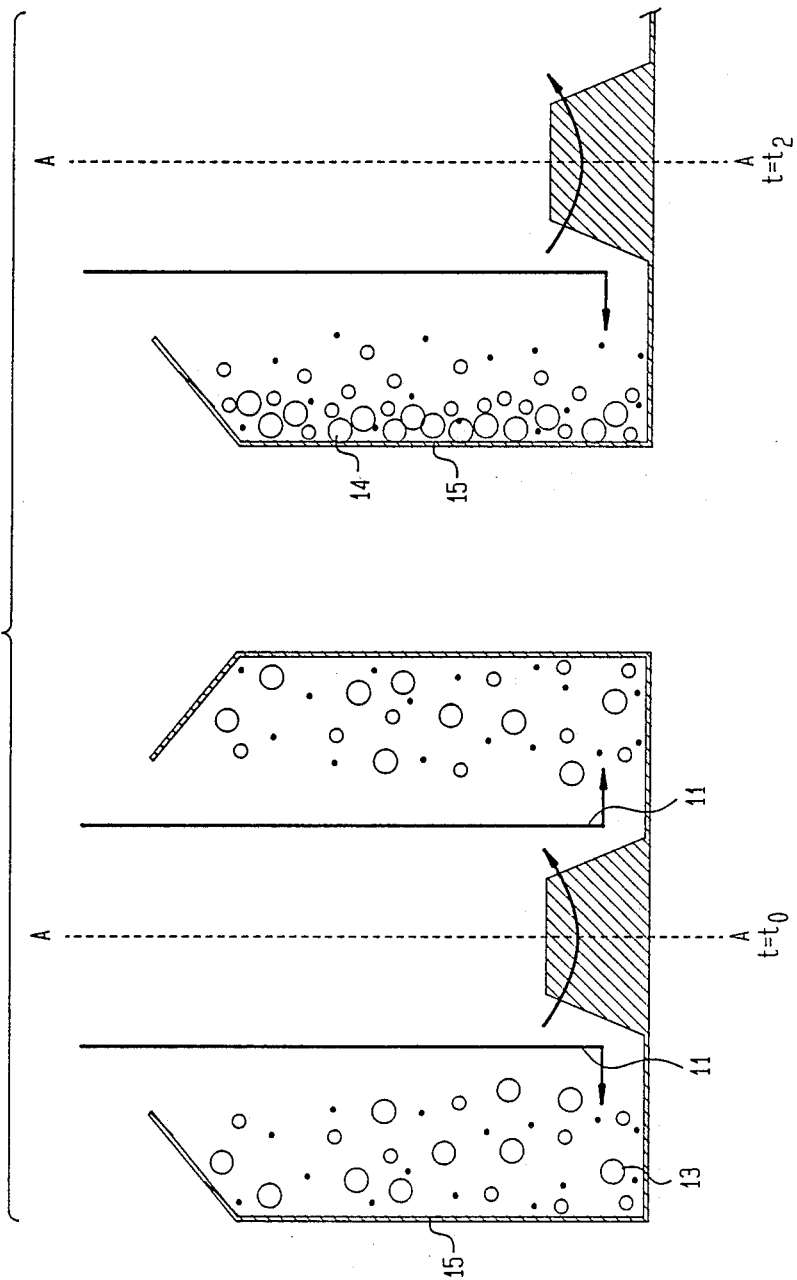
FIG. 1 is a vertical section of a prior art apparatus, showing the dispersion of particles at times t=0 (just after the introduction of a suspension of colloids to be separated) and t=$t_2$ (after the bowl has been spinning for some time)

Our analysis of the prior art shows that a heretofore unappreciated characteristic of the centrifugation process involves the formation of a static fluid zone in the centrifuge bowl, and that particle separation is attributable to a phenomenon not properly explained in the prior art. The prior art, including centrifuge product literature, suggests that during centrifugation, the entire volume of liquid in a centrifuge bowl constitutes an active volume through which separation occurs. The prior art has produced a separation technology illustrated in FIG. 1, wherein a bowl spinning about axis A—A is provided with a colloidal suspension 13 via feed 11. At time t=0, when the suspension has first filled the bowl, the particulate distribution therein is substantially uniform, so that even near the outer diameter of the bowl and its outer wall 15, relatively small particles intermingle among relatively large particles. At time $t=t_2$, after the system has been running for a while, larger particles 20 collect to form a sediment layer 14 against the wall 15. However, because some of the smaller particles had also been initially present in the vicinity of the outer wall 15, a portion of the smaller particles are present in, and contaminate, the sediment layer 14.

Figure 2:
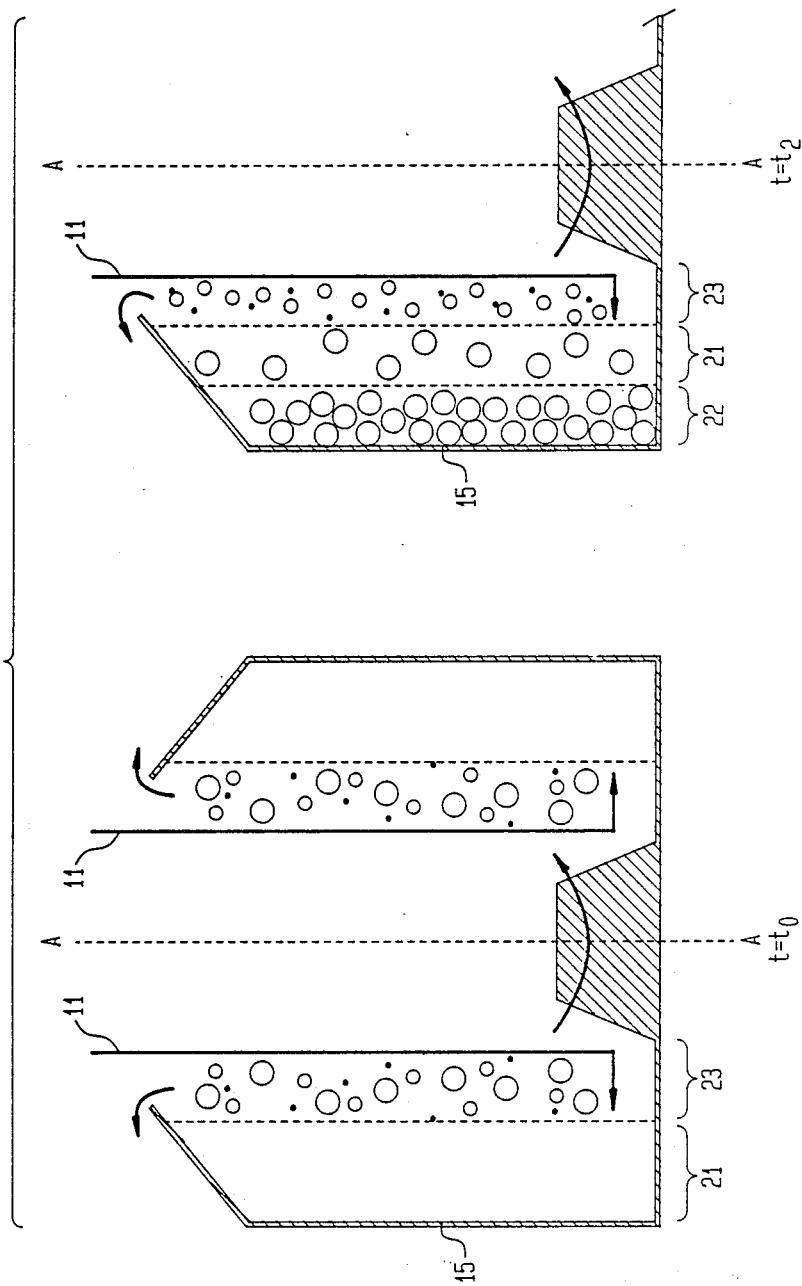
FIG. 2 shows vertical sections of a spinning centrifuge bowl filled with fluid in accordance with the present invention, showing a static zone of liquid at time $t_1$ (just after the introduction of a suspension of colloids to be separated) and at time t=$t_2$ (while the centrifuge is still running but after it has been run for a period of time to produce a layer of collected colloids)

We believe that the prior art view of the centrifugation process, in which the entire volume of liquid in a centrifuge bowl is viewed as an active volume through which separation occurs, is incorrect. We have discovered that during centrifugation, a static zone of fluid forms against the bowl wall. The thickness of the static zone is determined by the geometry of the bowl. A system and process for separating a suspended colloidal phase in accordance with our discovery is illustrated in FIG. 2. As a colloidal suspension is introduced via feed 11 into a bowl spinning about axis A—A, fine particles are forced upward in a dynamic zone 23 and over the lip of the bowl, but not in a static zone 21 of liquid. For purposes of illustration, the thickness (in a radial direction) of the dynamic zone 23 has been exaggerated in all of the figures herein. In fact, within the static zone 21, displacement of particles is primarily radial, and there is only very limited vertical displacement. Particle separation is believed to occur primarily before the particles enter the static zone. Accordingly, in an embodiment of the present invention, a fluid medium, distinct from the colloidal suspension, is first introduced into the centrifuge bowl. When the bowl is spinning, the static zone 21 is established, and then the suspension is introduced via feed 11 into the bowl, so as to form dynamic layer 23 at time $t=t_1$. After the system has been in operation for a period of time, at time $t=t_2$, larger particles collect to form a layer 22 against outer wall 15. Because initially at $t=t_1$ none of the smaller particles were present in the static zone 21, proximate to the wall 15, the smaller particles do not substantially contaminate the layer 22 of collected colloid—all of the larger particles that are collected must make the journey across the static zone 21 from the dynamic zone 23.

Figure 3:
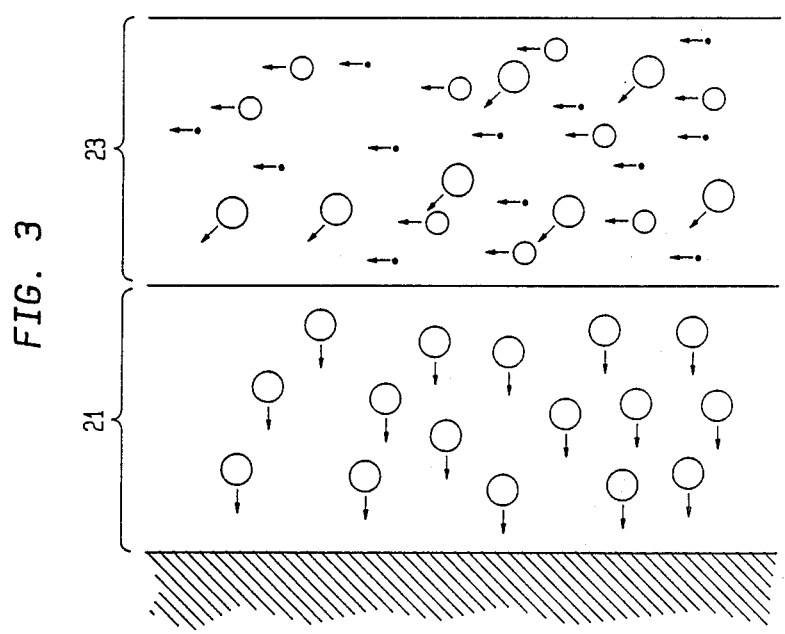
FIG. 3 is an expanded vertical section of the spinning bowl of FIG. 2 at time t=$t_2$ showing the trajectories of colloids in the suspension.

As shown in FIG. 3, which presents an expanded vertical section of a portion of the bowl of FIG. 2 at time $t=t_2$, vertical displacement of the fine particles, shown as solid, occurs substantially only in a dynamic zone 23 located concentrically inside of the static zone 21. (The trajectories of the particles are shown with arrows.) Discovery and appreciation of the static zone enables, among other things, more precise calculation of residence time parameters and consequently, higher quality of size fractionation than was heretofore possible using the prior art approach shown in FIG. 1.

Figure 4:
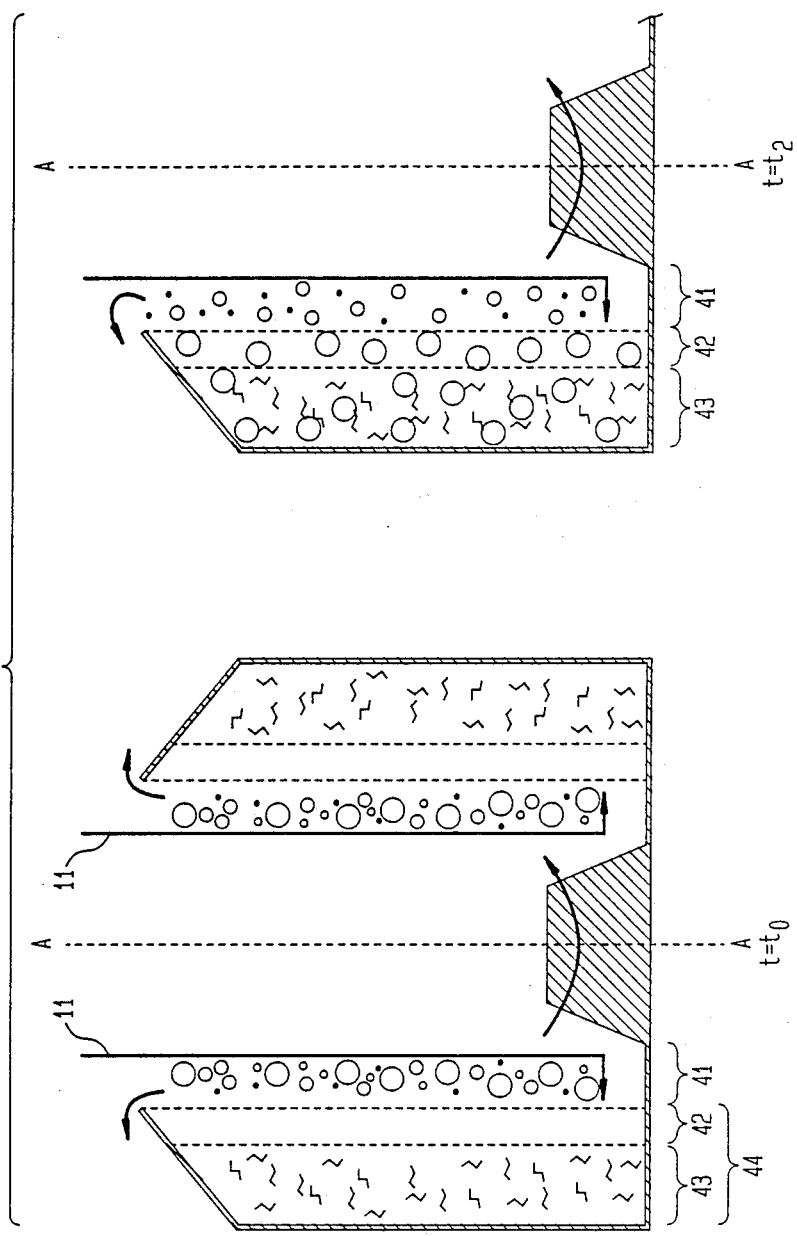
FIG. 4 shows vertical sections of a spinning bowl in accordance with the present invention, wherein the static zone includes both a separation zone and a reaction zone, in the last zone including a reagent that reacts with the colloidal phase, so that the larger colloids have reacted with the reagent following their separation.

Additionally, the static zone can be employed as a chemical reactor, as shown in FIG. 4, wherein larger particles are brought into contact with a reagent during settling. In this embodiment of the invention, the static zone 44 includes a separation zone 42 and a reaction zone 43. To establish these zones one may, for example, successively place in the spinning bowl first a fluid reagent (to form zone 43) and then a second fluid (which may be a fluid or a second fluid reagent first distinct from the fluid reagent) to form zone 42. The suspension is then provided through a feed, as described above in connection with FIG. 2, so as to form a dynamic zone 41. In operation, after a period of time, at time $t=t_2$, larger particles will be seen to be traversing the separation zone 42 and entering the reaction zone 43. In this fashion, the larger, but not the smaller particles, may be caused to react with the fluid reagent. The method of the present invention permits a wide range of reagents to be employed. The reagent may be introduced as an additional fluid component, separated from the first zone by an immiscible boundary zone, or the reagent may itself form a fluid zone used as above. Employing the static zone as a reactor provides excellent flexibility in reacting components, because of the variable residence time, particle concentration, and size fractionation.

The prior art would predict that an inaccuracy occurs as the sediment layer accumulates on the centrifuge wall. In accordance with the prior art model, the distance particles travel to reach the outer wall diminishes with the accumulation of the sediment on the centrifuge wall, and some fine particles, which would otherwise go into the overflow, should then hit the wall and remain there. Prior art would predict that this inaccuracy is unavoidable (unless the wall is continuously scraped or the operating conditions of speed and flow rate are changed), because the calculated minimum diameter of particles within a cut constantly decreases with sediment buildup. Nevertheless, we have found this not to be the case, and the relative lack of variation in separation accuracy with accumulation of sediment on the centrifuge wall tends to confirm the validity of our model of the separation process.

In practice of the present invention, continuous flow centrifugation may be used to classify each unit volume of dispersion as it is introduced to the system. A centrifuge basket rotating at a constant angular velocity is filled with liquid, forming a wall of fluid. The slurry is then introduced at a calculated feed rate determined by the largest particle size desired:

$$\text{feed rate (ml/min)} = V/t_{min} = 60 \ V/t_{sec}$$

where $V$ = the volume of the centrifuge basket. We have found that fortuitously, this equation, based on the prior art model of centrifugation, approximately describes the behavior of the model discussed herein. An intuitive understanding of the reason for the applicability of this equation can be had by appreciating that there is a direct proportionality among residence time, settling velocity, and settling distance for the model disclosed herein and the prior art model, and the proportionality in each case is approximately the same. Particles larger than this size accelerate into the static zone, settle through this zone, and then collect against the inside wall of the basket; finer particles remain in the dynamic flow, are carried up and over the fluid wall in the overflow.

The present invention may be utilized in one or more stages of a multi-stage classification system as described in our co-pending application U.S. Pat. No. 4,781,671 which is hereby incorporated herein by reference.

Stokes' law can predict centrifuge cut sizes accurately if all particles are spherical, nonagglomerated, and do not collide or interact with one another. Nonspherical particles can be accounted for by the geometric factor K, but every irregularly shaped particle has a slightly different geometric factor, causing some desired particles to be excluded from the classified powder. Geometric factors can be calculated for classified material to enhance cut precision. Agglomerated particles are also irregularly shaped and usually much larger than the primary particles of which they consist. Deagglomeration of powders by ultrasonic dispersion or other means is very important since undesired fine particles could otherwise be contained in agglomerates that are within the classified powder size range. Concentrated suspensions yield powder cuts very different from theoretical due to the numerous particle interactions: these interactions disturb the particles' velocity, sometimes causing large particles to be carried over with fine particles in the supernatant.

The following examples are illustrative of the present invention:

EXAMPLE 1

Into a spinning centrifuge having a 340 ml capacity were added:

100 ml ½ weight percent Corcat P600 (a cationic amino-based polymeric flocculant obtained from Cordova Chemical Company, Michigan); and 240 ml deionized $H_2O$. This liquid mixture formed a static zone. Feed was then introduced, comprising:

10 vol. % A16 Alumina (from Aluminum Company of America, Pittsburgh, Pa.);

89 vol. % deionized $H_2O$; and 1 vol. % Narlex LD-45 (from National Starch Co., Bridgewater, N.J.), an anionic polymeric polyelectrotyle dispersant.

If the above procedure is followed but omitting the Corcat flocculant, the result is a well-packed, high-density, stiff low-moisture (86% solids by weight) sediment cake which is difficult to remove from the bowl.

If the above procedure is followed verbatim, including the flocculant, the result is a poorly packed, creamy (40 wt. % solids), sediment cake which allows easy removal of classified product from the bowl. The flocculant neutralizes the dispersion effects of LD-45.

EXAMPLE 2

The steps are similar to the above, but with a halogenated hydrocarbon (such as Freon TF from E.I. DuPont de Nemours, Wilmington, Del.) used to form the static zone. The halogenated hydrocarbon is immiscible with water and has a higher density than does water, so the system is stable thermodynamically and mechanically. The particles are stable in the water zone, but not in the hydrocarbon zone, so that the particles flocculate when they enter the hydrocarbon zone.

EXAMPLE 3

The steps are similar to the above, but with acid (pH=3 nitric acid/$H_2O$ solution), in lieu of Corcat. Similar results are achieved. The system works with acid because as LD-45 is neutralized, dispersing power is reduced.

This invention produces a precise size fraction or "cut", using a process of "continuous flow" centrifugation, in which a rotating centrifuge basket is first filled with fluid, forming a static layer of liquid. Dispersion is then introduced into the system, and is classified according to Stokes' law.

Classified powder is usually collected in the centrifuge basket as a moist cake: the flow rate and centrifuge speed during the final centrifugation step are set for the lowest particle daimeter wanted. Particles having a diameter smaller than this are carried over the basket wall in the overflow, leaving particles with the lowest desired diameter or larger in the basket.

Residence time and centrifugal acceleration are the fundamental parameters determinative of particle size separation. These parameters are varied by controling feed rate and centrifuge speed, which are calculated with reference to the minimum particle size desired in the basket. Particles smaller than the desired size are driven into the overflow.

EXAMPLE 4

Figure 5:
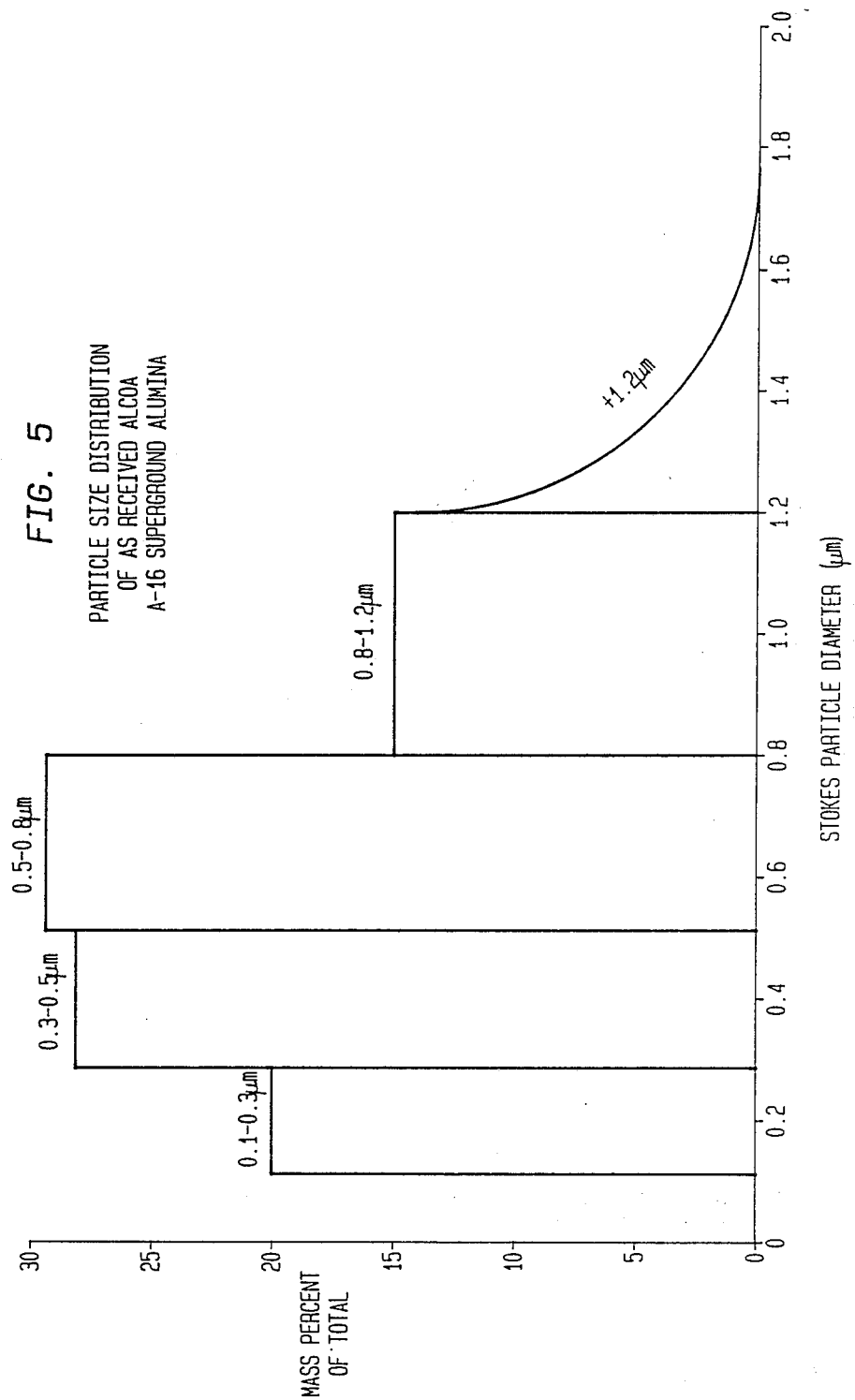
FIG. 5 is a graph showing the particle distribution of a commercial alumina prior to classification in accordance with the present invention.

A four-stage classifying system was first primed with one residence volume of water. $Al_2O_3$ (60 weight percent) A-16 SUPERGROUND from Aluminum Company of America, Pittsburgh, Pa., was mixed with water (39.25 weight percent) and the dispersant, a polymeric polyelectrolyte sold under the brand name NARLEX LD-45 (0.75 weight percent suspension basis). NARLEX LD-45 can be obtained from National Starch & Chemical Corp., Bridgewater, N.J. This mixture was milled, filtered, then pumped into the classifier feed tank. The starting size distribution range is shown in FIG. 5. The feed suspension was then pumped at 1.0 kg/min into a classifier operating at 973 rpm which resulted in the removal of particles larger than 1.2 micrometers from the feed. The particles were collected in the centrifuge basket.

The resulting overflow suspension containing particles smaller than 1.2 micrometers was pumped at 0.850 kg/min into a classifier operating at 1268 rpm. Here, a separation of particles of 0.8-1.2 micrometers, with a specific surface area of 7.6 $m^2/g \pm 0.5$ $m^2/g$, calculated for over 150 production runs, was achieved. Actual size distribution is shown in FIG. 6.

Figure 7:
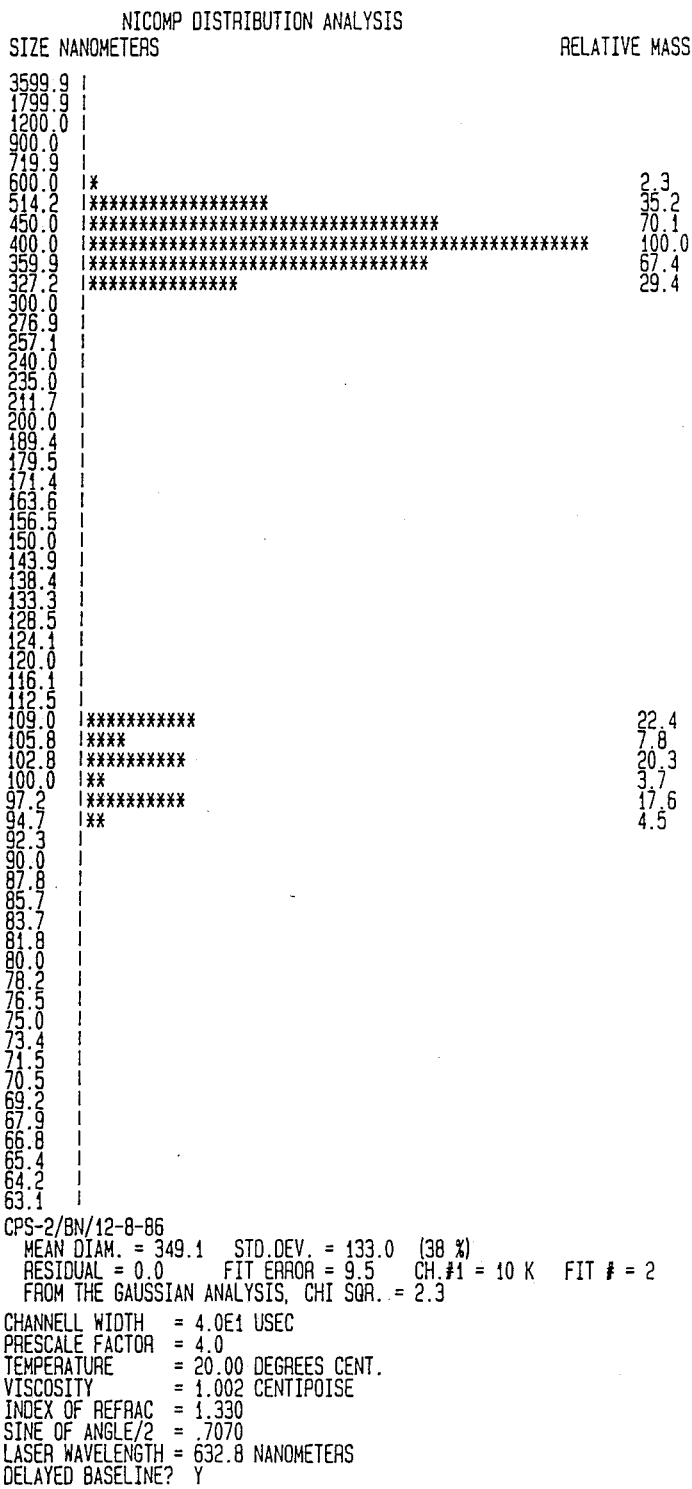
FIG. 7 is a graph showing the particle size distribution after a third classification process in accordance with the present invention.

Liquid containing the remaining particles smaller than 0.8 micrometers was pumped at 0.760 kg/min into a classifier operating at 1942 rpm. Here, a separation of particles of 0.5-0.8 micrometers, with a specific surface area of 9.56 $m^2/g \pm 0.5$ $m^2/g$, calculated over 150 production runs, was achieved. The actual size distribution of these particles is shown in FIG. 7.

Figure 8:
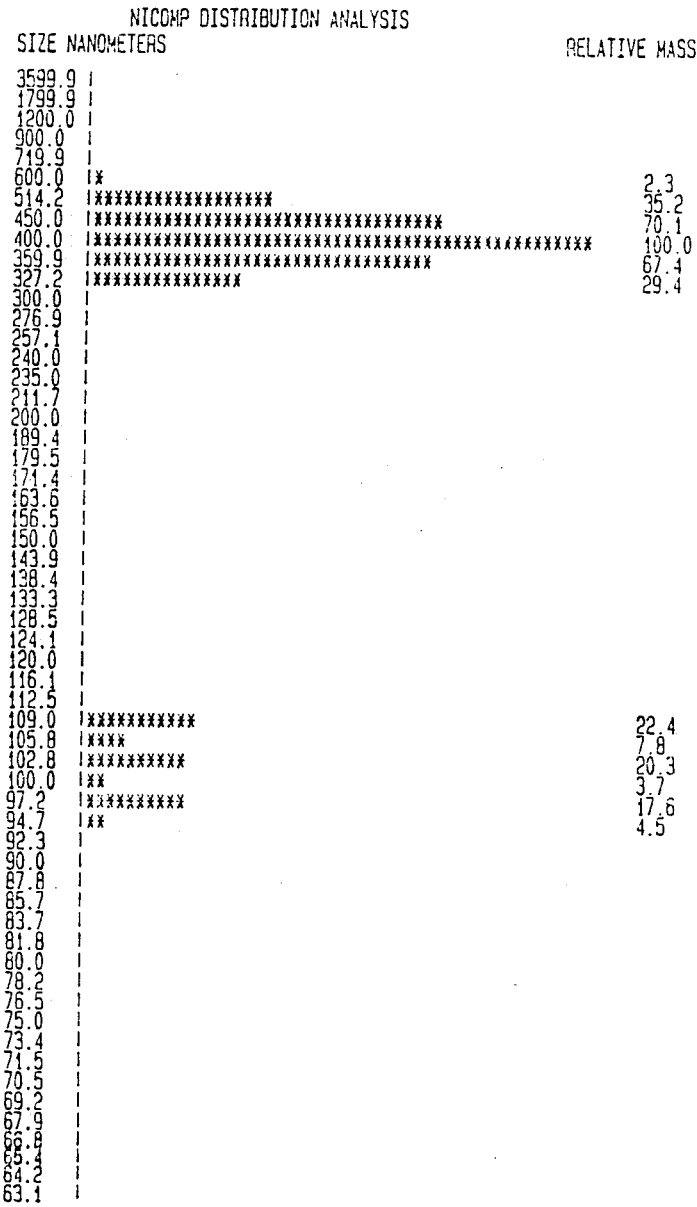
FIG. 8 is a graph showing the particle size distribution after a fourth classification process in accordance with the present invention.

Particles smaller than 0.5 micrometers were pumped at 0.506 kg/min into a fourth classifier operating at 2700 rpm. Here, a separation of particles of 0.3-0.5 micrometers, with a specific surface area of 11.5 $m^2/g \pm 0.5$ $m^2/g$, calculated over 150 production runs, was achieved. FIG. 8 shows the actual size range of these particles.

What is claimed is:

1. An improved method of centrifugally separating and recovering a colloidal phase from a fluid suspension, of the type comprising the steps of adding the fluid suspension into a rotating centrifuge bowl whereby desired colloids are separated from the suspension, wherein the improvement comprises:

filling a rotating centrifuge bowl with a fluid medium distinct from the suspension, so that a static layer of fluid medium forms adjacent the bowl wall and rotating therewith; and then introducing the suspension into the rotating centrifuge bowl concentrically inside of the static layer, and wherein the colloids are insoluble, such that a size range of colloids is separated from a broader size range of colloids in the fluid suspension into the static layer.

2. A method of centrifugally separating and recovering a narrower size range of a colloidal phase from a broader size range of colloids in fluid suspension, comprising:
 (a) activating a bowl-type centrifuge;
 (b) introducing an amount of a fluid medium distinct from the suspension into the rotating centrifuge bowl, effective to form a static layer of fluid adjacent the centrifuge bowl wall and essentially static with reference thereto; and then
 (c) introducing the suspension into the rotating bowl at a location concentrically inside of the static layer so that the narrower size range colloids separate from the broader size range of suspended colloids into the static layer.

3. A method according to claim 2, wherein step (b) includes the step of introducing a fluid medium including at least one reagent that reacts with the colloidal phase subsequent to step (c).

4. A method according to claim 3, wherein step (c) includes the step of introducing a suspension having a colloidal phase selected from the group consisting of ceramics, metals, and suspended liquid phases.

5. A method according to claim 2, wherein step (c) includes the step of introducing a suspension having a colloidal phase selected from the group consisting of ceramics, metals, and suspended liquid phases.

6. A method according to claim 2, wherein the step of introducing the suspension into the bowl includes pumping the suspension into the bowl at an externally controlled mass flow rate.

7. A method according to claim 3, wherein the step of introducing the suspension into the bowl includes pumping the suspension into the bowl at a controlled mass flow rate.

8. A method according to claim 2, wherein the step of introducing the suspension into the bowl includes pumping the suspension into the bowl at a controlled mass flow rate.

9. A method according to claim 3, wherein step (b) includes the step of forming a plurality of distinct layers concentrically disposed with respect to each other in the centrifuge bowl, each layer including at least one reagent.

10. A system for centrifugally separating and recovering colloids of a desired size range from a broader range of particle sizes in suspension, the system comprising:
 a rotating centrifuge bowl;
 a fluid medium distinct from the suspension and including at least one reagent, introduced into the rotating bowl effective to form a static layer with reference to the rotating bowl wall and adjacent thereto; and
 feed means for introducing the suspension into the rotating bowl at a feed location concentrically inside of the static layer, so that as the suspension is introduced into the bowl, the suspension forms a layer concentrically within the static layer and the desired size range particles separated from the broader range of particle sizes in the suspension settle into the static layer and react with the at least one reagent as they settle through the static layer.

11. A system for centrifugally separating and recovering colloids of a desired size range from a broader range of particle sizes in suspension, the system comprising:
 a rotating centrifuge bowl;
 a fluid medium distinct from the suspension, introduced into the rotating bowl effective to form a static layer with reference to the rotating bowl wall and adjacent thereto; and
 feed means for introducing the suspension into the rotating bowl at a feed location concentrically inside of the static layer, so that as the suspension is introduced into the bowl, the suspension forms a layer concentrically within the static layer and the desired size range particles separated from the broader range of particle sizes in the suspension settle into the static layer,
 the system further comprising another fluid medium distinct in composition from both the suspension and the static layer, introduced successively into the spinning bowl to from a second static layer disposed concentrically outside of the feed location.

* * * * *